Figure 1:
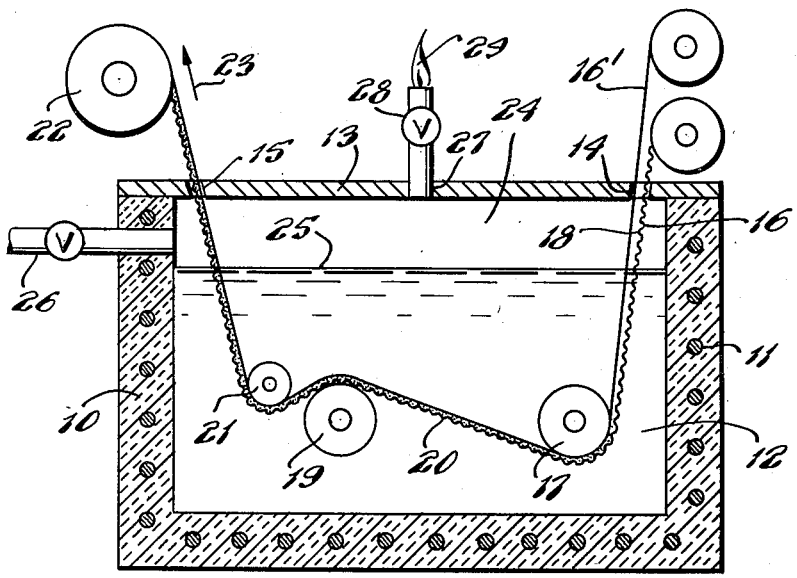

Jan. 13, 1953    J. CADGENE    2,625,497
PROCESS OF FUSING THERMOPLASTIC FABRIC SHEETS TO EACH OTHER
Filed June 17, 1949

INVENTOR.
JACQUES CADGENE
BY

Patented Jan. 13, 1953

2,625,497

UNITED STATES PATENT OFFICE 2,625,497

PROCESS OF FUSING THERMOPLASTIC FABRIC SHEETS TO EACH OTHER

Jacques Cadgene, Paterson, N. J.

Application June 17, 1949, Serial No. 99,787

10 Claims. (Cl. 154—75)

My present invention relates to processes of applying to the surface of a fabric or part thereof a plastic coating material.

It is an object of my present invention to firmly apply a plastic material to the surface or part of the surface of a fabric in an extremely simple way.

It is a further object of my present invention to carry out above process in an inexpensive manner without complicated machines involving considerable expenses.

Another object of my present invention consists in fusing two fabrics at least one of which consists of thermoplastic yarns or filaments, permanently to each other.

With the above objects in view, my present invention mainly consists in a process of fusing to at least part of the surface of a fabric consisting of a material having a certain melting point a plastic coating material having a lower melting point than the material of which said fabric consists, the process comprising the step of passing the fabric with the plastic coating material applied to at least part of its surface through a heated bath of molten metal having a temperature insufficient to melt the material of which the fabric consists but sufficient to at least partly melt the plastic coating material so as to fuse the same to the fabric.

The plastic coating material is preferably a thermoplastic substance such as resins, certain cellulose acetates, and glass compositions.

The fabric to which the thermoplastic coating material is applied might consist also of a plastic material such as glass; however, it has to have, as set forth above, a melting point which is higher, preferably substantially higher, than the melting point of the plastic coating material to be applied.

My present process is also very well adapted for fusing to the surface of a first fabric a second fabric consisting of a plastic material having a melting point not exceeding the melting point of the material of which the first fabric consists, the process comprising the step of passing the fabrics superimposed upon each other through a heated bath of molten metal having a temperature sufficient to plasticize the plastic material of which the second fabric consists so as to fuse the same to the first fabric.

In this event, it is advisable to press the two fabrics during their passage through the heated bath of molten metal against each other so as to ensure proper contact and consequent complete fusing.

In accordance with my present invention, it is also possible to fuse two thermoplastic fabrics to each other; this particular process includes the step of passing the thermoplastic fabrics superimposed upon each other through a heated bath of molten metal having a temperature sufficient to plasticize the plastic material of which at least one of the fabrics consists so as to fuse the thermoplastic fabrics to each other.

Of course, it is possible to make two thermoplastic fabrics of plastic filaments or yarns having substantially the same melting point; in this event, both fabrics will be plasticized and firmly adhere to each other.

In general, the time of passage of the fabric or fabrics through the metal bath depends upon the type of plastic material of which the plastic coatings and/or plastic fabrics consist. Of course, the temperature of the metal bath is also to be taken into consideration when determining the time of immersion of the fabric or fabrics into the bath. Nevertheless, it might be stated that in general the time of treatment, i. e. immersion into the metal bath, varies between three and sixty seconds, depending upon the above listed various conditions influencing the treatment.

It has been found that the surface of a molten metal bath has the tendency to oxidize and cause formation of a metal oxide layer on the surface of the molten metal. In order to avoid such oxide layer which adversely affects the treated fabrics, it is advisable to provide a zone of inert gas, at least at those surface portions of the metal bath where the fabrics enter and leave the bath, so as to prevent adherence of oxides to the surface of the treated fabrics. Reducing gases, such as carbon monoxide, are particularly well adapted for the purposes of my present invention.

Figure 2:
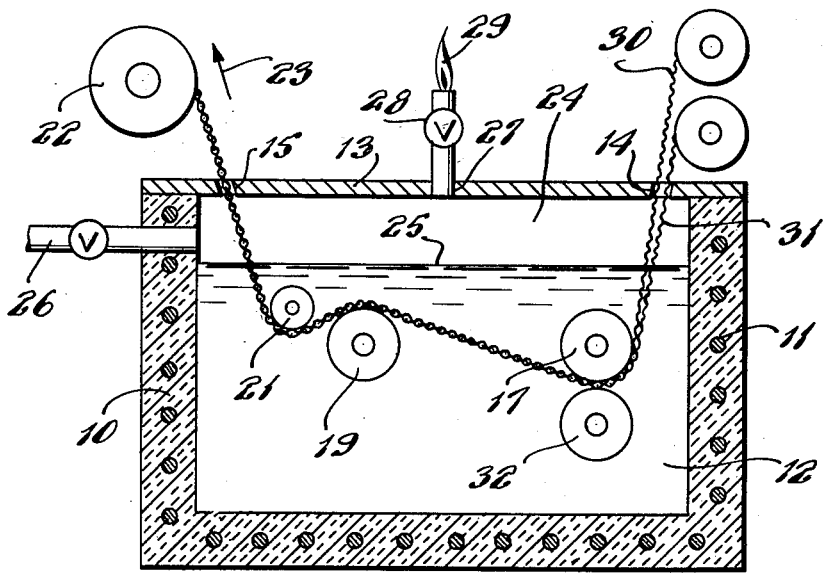

The novel features which I consider as characteristics for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic cross section through a metal bath arrangement adapted for the purposes of my present invention; and Fig. 2 is a schematic showing of a modified metal bath arrangement similar to the one shown in Fig. 1, but equipped with a pressure roller.

The arrangement shown in Figure 1 consists of a vessel 10 made of a heat insulating material in which the electric heating coils 11 are embedded.

This vessel 10 is partly filled with a molten metal alloy 12, heated by means of the heating coils 11.

The vessel is closed on its top by a cover 13 provided with two slots 14 and 15. The fabric 16 with the plastic coating material 16' applied thereto enters the vessel through slot 14, passes over the first metallic supporting roller 17, engaging face 18 of the fabric, and over the second metallic supporting roller 19, engaging the face 20 of the fabric. Then the fabric 16 passes over the guiding roller 21 and is pulled out of the metal bath through the outlet slot 15 by means of the take-up roller 22 exerting tension on the fabric in direction of arrow 23.

It should be noted that it is of great importance that the metal rollers 17 and 19 engage both faces 18 and 20, respectively, of the fabric 16, as otherwise the metal particles of the metal bath 12 are unable to properly penetrate and affect all filaments of the fabric. This seems to be due to the fact that air particles are caught between the filaments preventing access of the molten metal to the surface of all filaments and that these air particles are removed by passage of the fabric over the rollers 17 and 19.

It is evident that during passage of the fabric 16 with a plastic coating material 16' applied thereto through the metal bath 12 the plastic coating material 16' will melt and be firmly fused to the filaments of the fabric 16, as intended in accordance with my present invention.

The space 24 within the vessel 10 above the surface 25 of the metal bath 12 is preferably filled with a reducing gas, e. g. by introducing through conduit 26 carbon monoxide, preventing formation of an oxide film on the surface 25 of the bath. In order to control the presence of monoxide in the treating vessel, I have found it advisable to provide in the surface of the vessel a small exit opening 27 provided with a valve 28. The monoxide escaping through this opening is lighted and burns with a small flame 29. As long as this flame 29 is visible, there is carbon monoxide in the treating vessel and no danger of formation of an oxide film exists.

The arrangement shown in Figure 2 is very similar to the arrangement shown in Figure 1; the only difference is that two fabric sheets 30 and 31 enter the vessel 10 through slot 14 and pass the metal bath 12 superimposed upon each other so as to be fused to each other, as set forth above in detail.

Furthermore, in this embodiment of my present invention, I provide an additional pressure roller 32 arranged as shown, and cooperating with the first roller 17 so as to compress the fabric sheets 30 and 31 and thereby assist in fusing them to each other.

My new processes are carried out in the following way:

First, the vessel 10 is filled with a metal or metal alloy having a low melting point. Eutectic metal alloys are particularly well adapted for my purposes. Thus, I have found that alloys composed of cadmium, antimony and lead furnish a very good bath. Similarly, lead, tin, cadmium and similar alloys, such as bismuth, tin, lead alloys, are very well adapted as metal bath compositions.

Then, the vessel 10 is heated by means of the heating coils 11 until the desired metal bath is formed.

Thereafter, a reducing gas, such as carbon monoxide, is introduced through conduit 26, valve 28 is opened, and flame 29 is lighted.

The apparatus is then ready for operation and the fabric with the coating material applied thereto or the two fabrics to be fused to each other are then passed through it so as to immerse into the bath for a time period of between three and sixty seconds.

Several examples of my new process are described below without, however, limiting the scope of my present invention to the particular compositions and conditions set forth in the same:

Example I

A cotton fabric with thermoplastic coating material, e. g. vinyl resin, applied to its surface is passed through a metal bath consisting of 60% of lead, 20% of tin, and 15% of cadmium. The temperature of this metal bath is maintained at between 115° and 130° C. The speed of movement of the fabric is regulated so that it immerses into the bath for between ten to twelve seconds.

During this treatment, the vinyl resin is plasticized, while the cotton fabric remains unchanged. The plasticized vinyl resin adheres then as required to the filaments of the cotton fabric.

Example II

A glass fabric consisting of glass having a high melting point with part of its surface covered with a glass composition having a low melting point is passed through the bath of the above described composition. This bath is kept at a temperature which is above the melting point of the glass coating composition and below the melting point of the glass fabric itself. This treatment will result in fusing of the glass coating composition to the glass fabric.

Example III

A cotton fabric and a fabric consisting of a cellulose acetate are passed superimposed upon each other through a metal bath consisting of about 28% of bismuth, 48% of tin, and 34% of lead, kept at a temperature of about 110° C. so that they immerse into this bath for about thirty seconds.

During this treatment, the cellulose acetate fabric will be plasticized and will firmly adhere to the cotton fabric.

Example IV

A glass fabric and a fabric consisting of vinyl resin filaments are passed in superimposed condition through a bath of the type described in Example I having a temperature sufficient to slightly plasticize the vinyl resin. The resulting composite fabric consists of the glass and resin fabrics firmly adhering to each other.

It will be understood that each of the elements described above, or two or more together, may also find a useful application in other types of fusing processes, differing from the types described above.

While I have illustrated and described the invention as embodied in processes for fusing thermoplastic coating materials to fabrics and fusing thermoplastic fabrics to each other, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. Process of fusing to the surface of a first fabric strip a second fabric strip consisting of a plastic material having a melting point below that of the first fabric strip, said process comprising the steps of continuously inserting said fabric strips while maintaining the same spaced from each other individually into a heated bath of molten metal having a temperature sufficient to plasticize only the plastic material of which said second fabric strip consists, thereby eliminating adhering air from said fabric strips while said strips are maintained spaced from each other in said heated bath of molten metal; continuously moving said fabric strips along a predetermined path in said bath; superimposing said moving fabric strips upon each other within said bath of molten metal so as to fuse said plasticized second fabric strip to said first fabric strip; and continuously withdrawing said fused fabric strips from said bath of molten metal.

2. Process of fusing to the surface of a first fabric strip a second fabric strip consisting of a plastic material having a melting point below that of the first fabric strip, said process comprising the steps of continuously inserting said fabric strips while maintaining the same spaced from each other individually into a heated bath of molten metal having a temperature sufficient to plasticize only the plastic material of which said second fabric strip consists, thereby eliminating adhering air from said fabric strips while said strips are maintained spaced from each other in said heated bath of molten metal; continuously moving said fabric strips along a predetermined path in said bath; pressing said moving fabric strips together within said bath of molten metal so as to fuse said plasticized second fabric strip to said first fabric strip; and continuously withdrawing said fused fabric strips from said bath of molten metal.

3. Process of fusing to the surface of a first fabric strip a second fabric strip consisting of a thermoplastic material having a melting point below that of the first fabric strip, said process comprising the steps of continuously inserting said fabric strips while maintaining the same spaced from each other individually into a heated bath of molten metal having a temperature sufficient to plasticize only the thermoplastic material of which said second fabric strip consists, thereby eliminating adhering air from said fabric strips while said strips are maintained spaced from each other in said heated bath of molten metal; continuously moving said fabric strips along a predetermined path in said bath; superimposing said moving fabric strips upon each other within said bath of molten metal so as to fuse said plasticized second fabric strip to said first fabric strip; and continuously withdrawing said fused fabric strips from said bath of molten metal.

4. Process of fusing thermoplastic fabric strips to each other, said process comprising the steps of continuously inserting said fabric strips while maintaining the same spaced from each other individually into a heated bath of molten metal having a temperature sufficient to plasticize at least one of said fabric strips, thereby eliminating adhering air from said fabric strips while said strips are maintained spaced from each other in said heated bath of molten metal; continuously moving said fabric strips along a predetermined path in said bath; superimposing said moving fabric strips upon each other within said bath of molten metal so as to fuse said fabric strips together; and continuously withdrawing said fused fabric strips from said bath of molten metal.

5. Process of fusing thermoplastic fabric strips to each other, said process comprising the steps of continuously inserting said fabric strips while maintaining the same spaced from each other individually into a heated bath of molten metal having a temperature sufficient to plasticize said fabric strip, thereby eliminating adhering air from said fabric strips while said strips are maintained spaced from each other in said heated bath of molten metal; continuously moving said fabric strips along a predetermined path in said bath; pressing said moving fabric strips together within said bath of molten metal so as to fuse said plasticized fabric strips to each other; and continuously withdrawing said fused fabric strips from said bath of molten metal.

6. Process of fusing to the surface of a first fabric strip a second fabric strip consisting of a plastic material having a melting point below that of the first fabric strip, said process comprising the steps of preparing a heated bath of molten metal having a temperature sufficient to plasticize only the plastic material of which said second fabric strip consists; maintaining an inert gas at the surface of said metal bath to prevent oxidation of the molten metal at said surface; continuously inserting said fabric strips while maintaining the same spaced from each other individually into said heated bath of molten metal, thereby eliminating adhering air from said fabric strips while said strips are maintained spaced from each other in said heated bath of molten metal; continuously moving said fabric strips along a predetermined path in said bath; superimposing said moving fabric strips upon each other within said bath of molten metal so as to fuse said plasticized second fabric strip to said first fabric strip; and continuously withdrawing said fused fabric strips from said bath of molten metal.

7. A process of fusing to the surface of a first fabric strip a second fabric strip consisting of a plastic material having a melting point below that of the first fabric strip, said process comprising the steps of continuously inserting said fabric strips while maintaining the same spaced from each other individually into a heated bath of molten metal having a temperature sufficient to plasticize only the thermoplastic material of which said second fabric strip consists, thereby eliminating adhering air from said fabric strips while said strips are maintained spaced from each other in said heated bath of molten metal; continuously passing said fabric strips over a first roller in said molten metal bath contacting one of said fabric strips to superimpose the moving fabric strips upon each other for fusing the plasticized second fabric strip to said first fabric strip and for removing air from between the yarns of said one fabric strip; continuously moving said fabric strips from said first roller over a second roller contacting the other of said fabric strips to remove air from between the yarns thereof;

and continuously withdrawing said fused fabric strips from said molten metal bath.

8. A process of fusing to the surface of a first fabric strip a second fabric strip consisting of a plastic material having a melting point below that of the first fabric strip, said process comprising the steps of continuously inserting said fabric strips while maintaining the same spaced from each other individually into a heated bath of molten metal having a temperature sufficient to plasticize only the thermoplastic material of which said second fabric strip consists, thereby eliminating adhering air from said fabric strips while said strips are maintained spaced from each other in said heated bath of molten metal; continuously passing said fabric strips between and in contact with a pair of rollers in said molten metal bath to superimpose the moving fabric strips upon each other for fusing the plasticized second fabric strip to said first fabric strip and for removing air from between the yarns of said fabric strips; and continuously withdrawing said fused fabric strips from said molten metal bath.

9. Process of fusing thermoplastic fabric strips to each other, comprising the steps of continuously inserting said fabric strips while maintaining the same spaced from each other individually into a heated bath of molten metal having a temperature sufficient to plasticize at least one of said fabric strips, thereby eliminating adhering air from said fabric strips while said strips are maintained spaced from each other in said heated bath of molten metal; continuously passing said fabric strips over a first roller in said molten metal bath contacting one of said fabric strips to superimpose the moving fabric strips upon each other for fusing the same to each other and for removing air from between the yarns of said one fabric strip; continuously moving said fabric strips from said first roller over a second roller contacting the other of said fabric strips to remove air from between the yarns thereof; and continuously withdrawing said fused fabric strips from said molten metal bath.

10. Process of fusing thermoplastic fabric strips to each other, comprising the steps of continuously inserting said fabric strips while maintaining the same spaced from each other individually into a heated bath of molten metal having a temperature sufficient to plasticize said fabric strips, thereby eliminating adhering air from said fabric strips while said strips are maintained spaced from ecah other in said heated bath of molten metal; continuously passing said fabric strips between and in contact with a pair of rollers in said molten metal bath to superimpose the moving fabric strips upon each other for fusing the plasticized second fabric strip to said first fabric strip and for removing air from between the yarns of said fabric strips; and continuously withdrawing said fused fabric strips from said molten metal bath.

JACQUES CADGENE.

REFERENCES CITED

The following references are of record in the file of this patent:

UNITED STATES PATENTS

| Number | Name | Date |
|---|---|---|
| 1,801,396 | Thatcher | Apr. 21, 1931 |
| 2,399,258 | Taylor | Apr. 30, 1946 |
| 2,431,050 | Kopplin | Nov. 18, 1947 |
| 2,468,656 | DeForest | Apr. 26, 1949 |
| 2,522,346 | Carson et al. | Sept. 12, 1950 |